US011023439B2

United States Patent
Bauman

(10) Patent No.: US 11,023,439 B2
(45) Date of Patent: Jun. 1, 2021

(54) VARIABLE CARDINALITY INDEX AND DATA RETRIEVAL

(71) Applicant: Morphick, Inc., Cincinnati, OH (US)

(72) Inventor: Daniel C. Bauman, Austin, TX (US)

(73) Assignee: MORPHICK, INC., Cincinnati, OH (US)

( * ) Notice: Subject to any disclaimer, the term of this patent is extended or adjusted under 35 U.S.C. 154(b) by 780 days.

(21) Appl. No.: 15/692,631

(22) Filed: Aug. 31, 2017

(65) Prior Publication Data

US 2018/0067937 A1   Mar. 8, 2018

Related U.S. Application Data

(60) Provisional application No. 62/382,486, filed on Sep. 1, 2016.

(51) Int. Cl.
*G06F 16/30* (2019.01)
*G06F 16/22* (2019.01)
*G06F 16/14* (2019.01)

(52) U.S. Cl.
CPC ........ *G06F 16/2255* (2019.01); *G06F 16/148* (2019.01); *G06F 16/2246* (2019.01)

(58) Field of Classification Search
CPC .......................... G06F 16/2246; G06F 16/2255
See application file for complete search history.

(56) References Cited

U.S. PATENT DOCUMENTS

| | | | | |
|---|---|---|---|---|
| 2004/0022245 | A1* | 2/2004 | Forbes | H04L 45/04 370/392 |
| 2009/0097654 | A1* | 4/2009 | Blake | G06F 16/9014 380/277 |
| 2013/0054217 | A1* | 2/2013 | Gullapalli | G06F 30/33 703/14 |
| 2013/0339407 | A1* | 12/2013 | Sharpe | G06F 3/0611 707/827 |
| 2014/0337375 | A1* | 11/2014 | Yue | G06F 16/245 707/769 |
| 2016/0026666 | A1* | 1/2016 | Namiki | G06F 16/2246 707/744 |
| 2016/0197831 | A1* | 7/2016 | De Foy | H04L 45/7453 370/392 |
| 2016/0275143 | A1* | 9/2016 | Lyle | G06F 16/245 |
| 2018/0276264 | A1* | 9/2018 | Zheng | G06F 16/2237 |
| 2018/0357277 | A1* | 12/2018 | Erdmann | G06F 16/24532 |

* cited by examiner

*Primary Examiner* — Mahesh H Dwivedi
(74) *Attorney, Agent, or Firm* — BakerHostetler

(57) ABSTRACT

Systems and methods for a variable cardinality index and data retrieval. A multi-level hash table increases cardinality from a top index and comprises multiple levels respectively pointing to at least one other level of hash tables. Each hash table comprises a unique file identification for a record in the index. A search engine module receives a token and cardinality limit, and performs a search through the multi-level hash table index for records associated with the token. The search is limited by the cardinality limit, and comprises a hash table lookup and a B-Tree progression. In response to a hit in the token search, the search engine performs a subsequent B-Tree progression from the hash table in which the hit occurred. The search engine returns the record, if encountered in the subsequent B-Tree progression. The unique file identification is returned if missing data is encountered, or the cardinality limit is reached.

17 Claims, 3 Drawing Sheets

Token: "Hello"
TopIndex: "title"
MaxHops:2

VARIABLE CARDINALITY INDEX AND DATA RETRIEVAL

CROSS REFERENCE TO RELATED APPLICATIONS

This application claims benefit under 35 U.S.C. § 119(e) of Provisional U.S. patent application No. 62/382,486, filed Sep. 1, 2016, the contents of which is incorporated herein by reference in its entirety.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

There are multiple ways to perform data indexing. Conventionally, most systems use either a "B-Tree" index, or a "hash table" index.

Hash Tables indices are known for the performance characteristic of O(1)/constant-time lookup speed regardless of the key chosen, or the size of the data set indexed. The engineering tradeoff needed to obtain O(1) speed, the entire Key/Value space must be mapped into physical memory.

B-Tree's excel in covering large data sets (exceeding the size of memory) at the cost of many path traversals through the tree. B-Tree's perform at O(n)/linearly scaled lookup speed, where n accounts for the total size of the index.

Both index types struggle to handle the common case of removing data from the index. In common hash table indexes, adding and removing data can be easy, but the resizing the underlying storage mechanism is cumbersome and difficult to optimize. Common B-Tree indexes, key removal requires traversing the tree to the record [O(n) lookup speed] and marking the record as deleted. The byproduct of this action in both models is that deleting records does may not shrink the size of the index.

Indexing (therefore query response) is inherently tied to data. Traditional database systems implicitly tie the index to the data. Once the data is deleted, the system automatically prunes the index. Current database methods explicitly state index hits where data is deleted is unfavorable.

In most current systems, index cardinality impacting query time is determined at program compile/install and not variable. Database systems generally create at least one index entry per row (SQL) or document (NoSQL). A query response may have a high cardinality response (hundreds or thousands of matching rows/docs—requiring a large index into memory), but if the user does not need high cardinality, this leads to excessive memory/disk consumption and higher than acceptable query response time.

Large indexes are prone to "memory thrashing" when index size exceeds memory size. Current index methods using single cardinality indexing scale query response time linearly with the number of rows/docs. Many databases have explicit requirement for physical memory size to exceed index size. For every query, the entire index must be searched for a result. It is desirable to operate a system where total index size exceeds physical memory size if, and only if, the access to individual indexes is curated in such a way to limit or eliminate "memory thrashing".

SUMMARY

Figure 1:
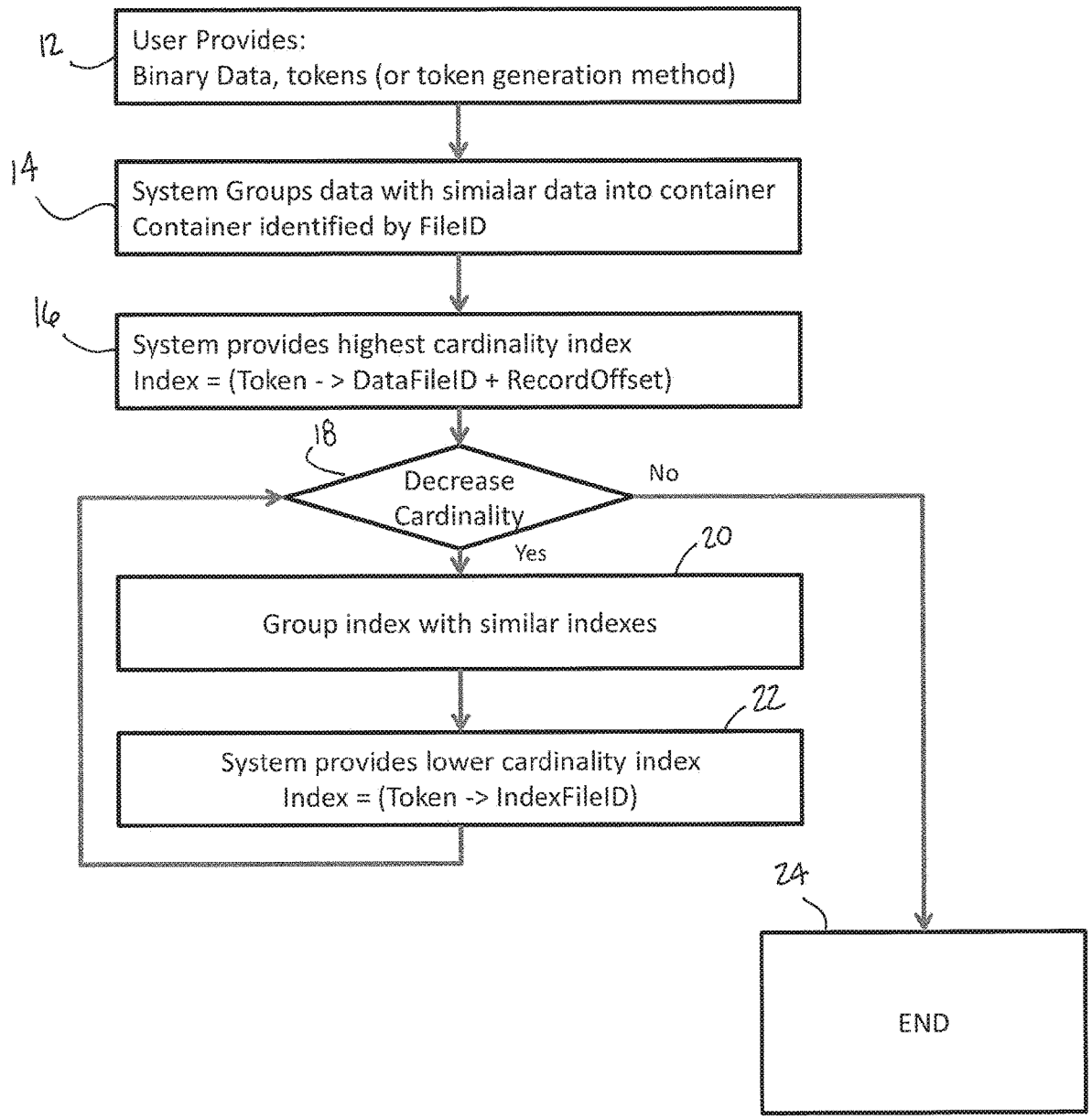
FIG. 1 depicts a flow diagram illustrating a storage phase of the current disclosure.

At a high level, the invention combines the ability to perform a combination of hash table and B-Tree indexing together to achieve a user's desired speed/performance requirements on a given search. For example, the user may choose (at query time) to have a fast response, which will result in the lower verbosity results. For example, the user may gain performance by accepting a low cardinality result returning a Boolean true/false stating that at least one record exists that matches the search criteria. That same user may gain verbosity at the expense of performance by requesting a high-cardinality result returning the actual row/document records matching the query.

On a more detailed level, the user will specify three things in the search:

1. The "Token", which is what is being searched for, such as an IP address, an email address, a character string, etc.
2. The "Top Index ID", which is the identifier of the index file to begin the search; and
3. The "Max Hop Count", which is the maximum depth of B-Tree style indexing to descend before returning information. This integer describes the desired maximum result cardinality magnitude of the result information.

With those three items, the system performs standard Hash Table lookup given the Token on the Top Index File. If there are hits, the system will perform a B-Tree style descent through each result until: (a) it finds the matching record, (b) is unable to continue due to missing data (for example, if that segment of the data set had been removed), or (c) it reaches the Max Hop Count. In the case of (a), the system will return the individual matching record. In the case of (b) or (c), the system will return the File ID (e.g., the file name or file path) of the file indicated at the current traversal depth into the index.

One advantage of the system (beyond providing the user with a variable cardinality index) is that any intermediary files can be removed (wiped) from under the system and the system can still provide useful feedback (File IDs). If the system cannot locate or retrieve a record, the system will still return the FileID of the record sought. This allows the user to delete or relocate the raw data, while leaving a small artifact that the record had existed at one time in the listed FileID.

Access begins with a small low cardinality index. Each progressively larger index is only opened if the low cardinality index points to it.

It is, therefore, an aspect of the current disclosure to provide a variable cardinality indexing and retrieval system, comprising: (A) a multi-level hash table index of increasing cardinality from a top index, including multiple levels of hash tables respectively pointing to other levels of hash tables in the multi-level hash table index and at least a portion of the hash tables in the multi-level hash table index respectively pointing to sub-set of a multitude of records, where each hash table includes at least a unique file identification for respective records in the multitude of records; and (B) a search engine module that performs a hash table lookup on each individual hash table, and a B-TREE progression through the multi-level hash table index, wherein said lookup and progression are limited according to a user defined level of cardinality as received by the search engine.

In a more detailed embodiment of the system, the search engine receives from a user a token for search and a cardinality limit; and the search engine progresses through levels of the multilevel hash table index in a B-TREE progression, performing token searches on each hash table through the progression. In a further detailed embodiment, upon encountering a positive result in a token search, the search engine progresses in a B-TREE descent from the hash table in which the positive result occurred looking for a respective record associated with the positive result, where this further progression remains limited according to the cardinality limit. In yet a further detailed embodiment, in the B-TREE descent from the hash table in which the positive result occurred looking for a respective record associated with the positive result: (1) if the search engine encounters the respective record, the search engine returns the respective record; (2) if the search engine encounters missing data in place of the respective record, the search engine returns the unique file identification for the respective record; and (3) if the search engine reaches the cardinality limit before encountering the respective record, the search engine returns the unique file identification for the respective record.

DETAILED DESCRIPTION

FIG. 1 is a flow diagram providing exemplary steps involved in a storage phase of the current disclosure. In such an exemplary process, the user provides a binary object that works under the following assumptions (other embodiments of the disclosure may not require such assumptions): 1. The format allows object concatenation; and 2. The format can read exactly one record given an offset into the concatenated file.

In the exemplary process, in step 12, a binary representation of some information to be recovered is delivered as well as a key (token or multiple tokens) to be used to recover the data at a later date. In step 14, the system will group the provided data with similar data into a container identified by a FileID (file identifier of some sort, such as Filename, path or ID). The container may also include additional information, such as a hash value of the record/document, an IP address (IPv4, IPv6, etc.), a domain ID, email address, etc. In step 16, the system creates the highest cardinality index where the token(s) provided in step 12 are mapped as keys within a hash table to the value as the FileID of the data container AND the offset to the single record within the container (generated in step 14). A single search token may yield multiple offsets for matching records within a single container.

The top-3 processes on the storage system are generally performing standard database indexing using a Hash table index.

If the system is directed to decrease the cardinality of the result set, in step 18, it will advance to step 20 to consume a grouped list of highly cardinal indexes and compile a result set with reduced cardinality on the result set. Advancing to step 22, rather than the results pointing to the DataFileID and offset position, the lower cardinality index will point to the next higher cardinality IndexFileID before returning to step 18 to check if the cardinality is to be reduced further. If step 18 directs the system to further reduce cardinality, step 22 performed in the second loop will store the lower cardinality IndexFileID rather than the higher cardinality IndexFileID. If step 18 instructs the system not to continue reducing cardinality, the process ends in step 24. Step 18 to 24 may be performed at any time as the grouping of similar indices becomes possible.

The resulting index will be a multi-level hash table index of increasing cardinality from a top index. The index will include multiple levels of hash tables respectively pointing to other levels of hash tables in the multi-level hash table index. At least a portion of the hash tables in the multi-level hash table index respectively point to sub-set of a multitude of records, where each hash table includes at least a unique file identification (FileID) for respective records in the multitude of records. Advantageously, the search engine component of the system performs O(1) hash table lookup on each individual index, but a B-TREE style approach to cascading through the assortment of indexes.

Figure 2:
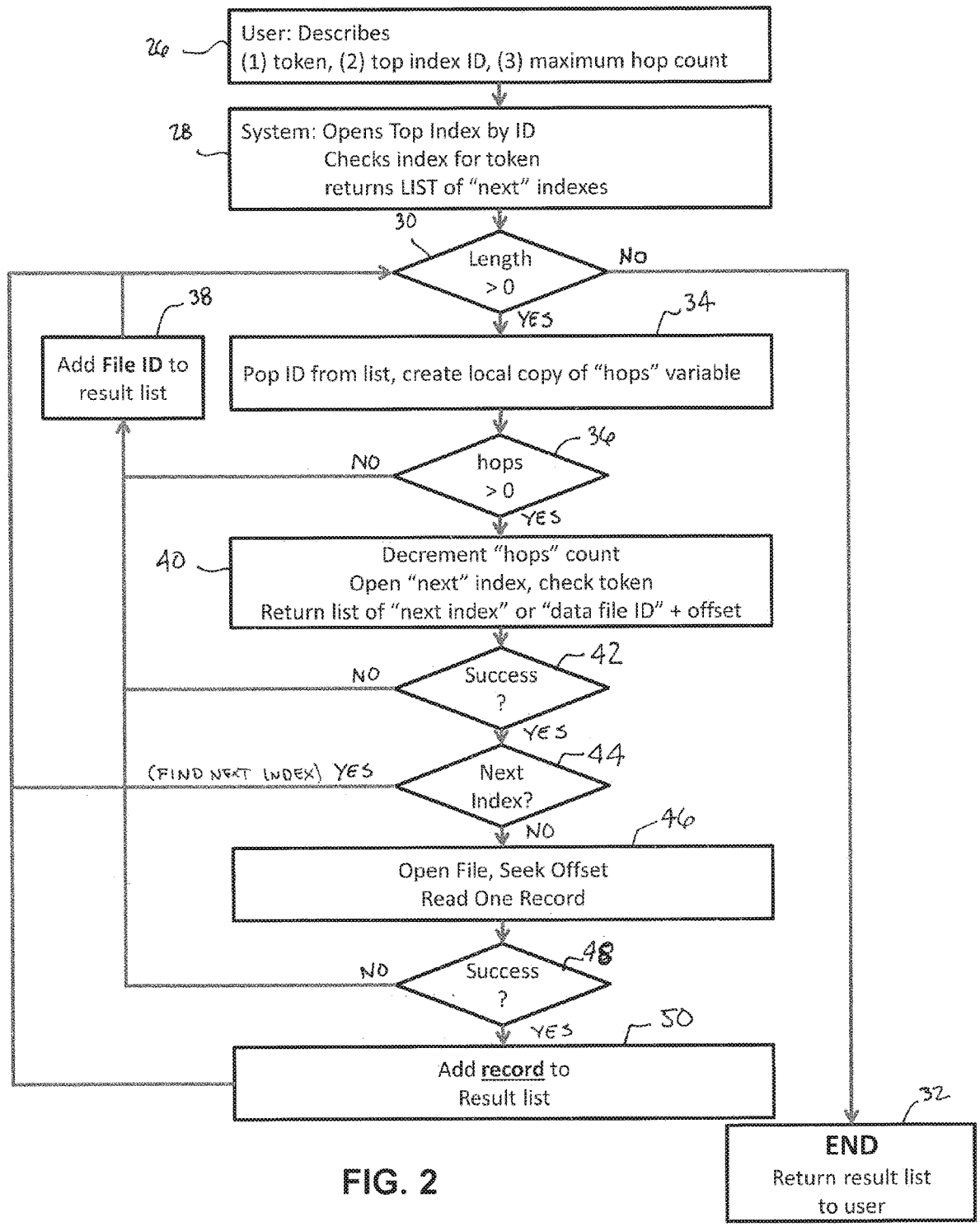
FIG. 2 depicts a flow diagram illustrating a query phase of the current disclosure.

FIG. 2 is a flow diagram providing exemplary steps involved in a query phase of the current disclosure.

In step 26, the search engine is provided with a Token, an ID to a top index to start the search (Top Index ID), and a maximum hop count (MaxHopCount) to lookup a record that may exist (these may be provided by a user). In step 28, the search engine opens the index identified by the Top Index ID and performs a hash table lookup for the Token in the index. If the top index has any matches, it will return a list of hits. If there are no hits, return an empty list to a user. This is expected performance of a standard hash table database index.

If there are hits, the system will perform its B-Tree style depth-first descent through the each result in the result list until it finds the matching record, is unable to perform the next operation, or reaches the maximum hop count (MaxHopCount).

The flowchart shows a descent where it looks at the value of the hit, determines if it is another index to open and traverse, if so it traverses and decrements the max hop counts. If it hits a record address, it attempts to open the container, seek to the position, and read the record. If the MaxHopCount is exceeded, the system stops traversing and returns the FileID at its current traversal depth.

In step 30, the system checks to see if number of hits are greater than zero. If not, the process ends at step 32. If the number of hits is greater than zero, then the process advances to step 34 where the first hit is removed from the list and prepared for further inspection. A "hops" variable is preloaded with the value of MaxHopCount indicating the inspection depth of the current hit branch.

In step 36, the system checks to see if the value of the "hops" variable is greater than zero. If not, the system has reached the end of the user-defined cardinality without reaching the desired file, so the system will just add the File ID of the current hash table (prepared in step 34) to the returned result list in step 38. If the "hops" variable is greater than zero in step 36, the system will advance to step 40, where it will check for the Token in the "next" (higher cardinality) index using a hash table lookup. If the token is found, the token's record will point to either a list of "next" (higher cardinality) indexes or a list of data file ID and offsets. In step 42, the step checks to see if the token has been found and a corresponding next index or data file ID and offset is pointed-to by the found token. If so, the process advances to step 44; and if not, indicating the next (higher cardinality) index has been deleted or otherwise unavailable, the process returns to step 38 to add the File ID to the returned result list.

In step 44, the process determines whether the token's record points to another, even higher cardinality, next index table. If pointing to a next index table, then the process returns back to step 30 to progress deeper into the multi-level hash table index. However, if the found token's record points to a data file ID and offset, the process advances to step 46 to attempt to open the file associated with the data file ID and seek to the identified record offset and read exactly one record stored at that offset. In step 48, the system checks to see if the attempt to open the file associated with the data file ID and seek to the record offset and read exactly one record at that offset in step 46 was successful. If so, it adds that record to the result list in step 50, and the process returns to step 30 to continue progressing through the multi-level hash table index. If not, the process returns to step 38 to add the File ID to the returned result list.

In such an exemplary system, any intermediary files can be wiped or relocated from under the system and the system can still provide the user with useful feedback. If the system cannot locate or retrieve a record, it will still add the FileID it sought to the result list. This allows the user to delete or relocate the raw data, while leaving a small artifact that the record had existed at one time in the listed file ID. As time goes on, the user has an option to delete or relocate intermediary cardinality indexes in addition to the raw data. The response to the user would show that the token they wish to find existed at one point, but is currently unavailable for direct access. In the case of index/data relocation, the system returned FileIDs would be useful to recover the sought records from slower storage media (tape/optical disk/offline storage/etc.).

The exemplary system allows hanging pointers to data where the data doesn't exist or isn't readily accessible. In prior art database systems, that is seen as a bad thing. But the current system returns useful information instead of merely returning an error because, in some instances, knowing that something happened may be nearly as valuable as the full context of the happening. On the other side of that coin, it's really no different than the Dewey decimal system at a library that can point you to the section+aisle of a book and doesn't break if the book is checked out at the moment you went to look for it.

Figure 3:
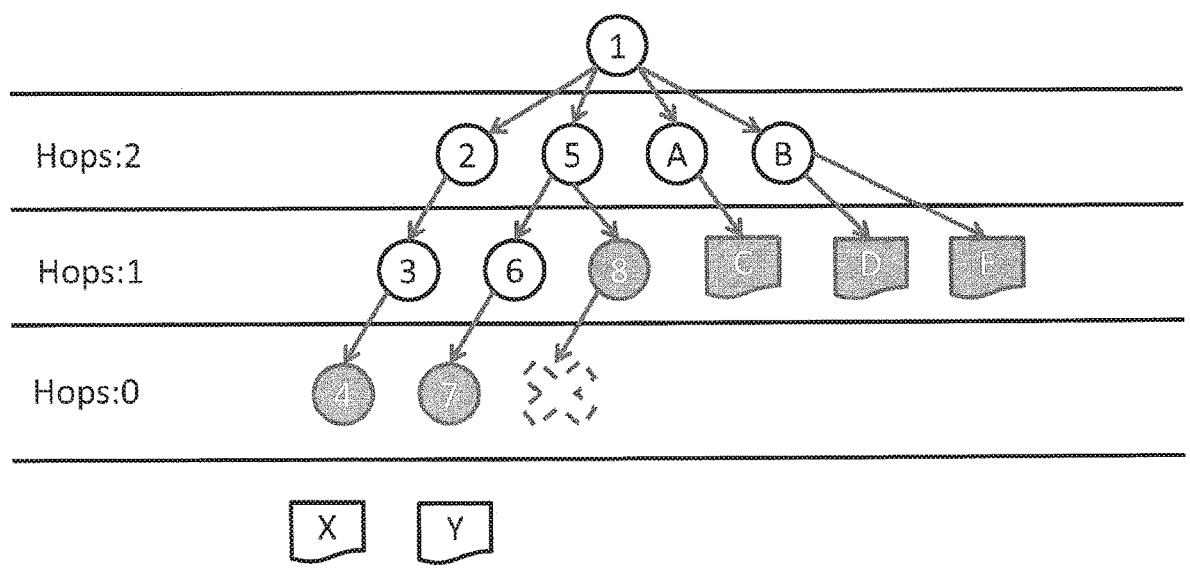
FIG. 3 illustrates an example process and results from a variable cardinality and data retrieval system in accordance with the current disclosure.
Figure 3:
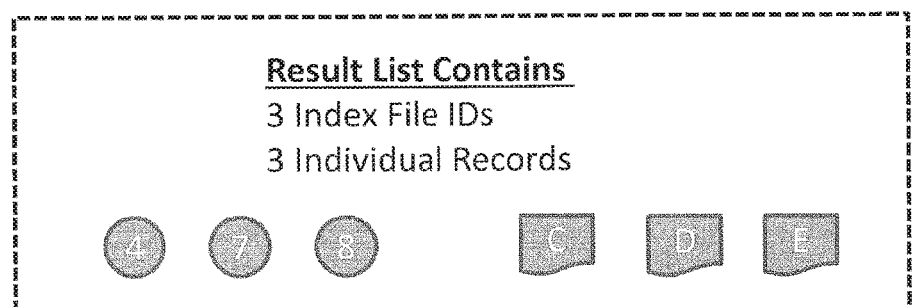

FIG. 3 provides a visual example of the current procedure and system. The system began its roots in network level metadata collection but extends to any binary data. This example shows the depth first (but capped) traversal process.

In this example, the top index FileID is given as name "title" and hash table ID "1"; the second level down in the index may include hash tables "2", "5", "A", and "B" pointed to by hash table "1". In the next level down, hash table "3" may be pointed to by hash table "2"; hash table "6" and "8" may be pointed to by hash table "5"; file/record "C" may be pointed to by hash table "A"; and files/records "D" and "E" may be pointed to by hash table "B". Then in the next level down, hash table "4" may be pointed to by hash table "3"; hash table "7" may be pointed to by hash table "6"; while the pointer from hash table "8" might result in an access error. In the next level down, file/record "X" may be pointed to by hash table "4" while file/record "Y" may be pointed to by hash table "7".

Following a library reference, an index might be for a Book title as:

Token: "Hello"
Topindex: Book Titles (hash table "1")
MaxHops: 2

The top index Points to "2," "5," "A," and "B" as the next places to look for deeper information. Analogy might be to look in the archive on $2^{nd}$, $5^{th}$, $10^{th}$, and $11^{th}$ floor.

The system traverses indexFileID "2," which points to indexFileID "3," which points to indexFileID "4." At that point, maxHops is exceeded. Although index at location "4" points to a data file and document "Y" that may exist, the system will return the indexFileID "4" rather than continuing to traverse. Analogy being the index on the $2^{nd}$ floor told you to go to room 3, cabinet 4, but decided not to declare what row the book was on.

The system then traverses index "5" that points to two different next indexes. Like index ID before, it stops and returns FileID "7" rather than traverse to document Y because the maxHops is exceeded before reaching document "Y." The system is unable to traverse to wherever indexFileID "8" pointed to, and therefore adds indexFileID "8" to the result list rather than returning an error. Analogy for "8" being the system points to a shelf that doesn't exist.

Index "A" points to a dataFileID+file offset "C" within the dataFile. The system is successfully able to open dataFile, seek to the offset and pull exactly one record and return that record to the user. Analogy being it successfully pointed to the book with the title the user requested. indexFileID "B" shows that it can handle a list of more than one as well and be transparent to the user.

In addition to the system returning documents quickly, the system may be able to perform additional, more broad/powerful queries against the returned document (if a document is returned). There may be instances where the query does not generate a narrow enough token to uniquely identify a single document, but the user cannot afford to use a broader/more-powerful query against the entire data corpus due to resource constraints. In the above example, the system will retrieve documents "C", "D" and "E" and the use of a subsequent, more powerful query would only need to validate the three returned documents rather than the thousands or millions of potential documents to start.

Tables 1-6 provide source code for use with an exemplary embodiment of the current disclosure. It is written in the python language and the reference implementation for the "binary" data storage is BSON (Binary JSON—an open specification). DiscoDB is the underlying library that handles the Hash Table indexing. DiscoDB is an open source implementation of basic hash table indexing, licensed BSD. At the last line of Table 1 begins the writer class which handles arbitrary user input and the transformation into the reference BSON storage machinery. By default, it constructs the highest cardinality indexer using the IndexWriter class from Table 2. The IndexWriter class.

The generate_recursive_root index function also implements finding and grouping "like" indexes to be re-indexed at the next lowest cardinality.

The Search class beginning in Table 3 implements the B-Tree like traversals of the Hash Table (discoDB) indexes. The source-code implementation of Tables 1-5 handles unlimited index traversals and data open/seek/read functionality, and a user-specified MaxHops feature as described herein can be easily added as illustrated by the additional source code excerpt provided in Table 6.

As can be seen by the above disclosure, the system can equally support cases where an analyst needs to triage/disposition many input questions quickly; and where an analyst needs to deep dive a very specific question requiring raw data access.

The system can tie source data to metadata to indexing and be able to "peel back the onion" automatically and transparently during query/access time. Given a large file (such as binary network packet capture [pcap]), the system consumes metadata (possibly IP addresses); performs tokenization/indexing; and variable cardinality index construction. The exemplary system supports network pcap (direct packet capture off the wire), as well as proprietary format binary files, and has a pluggable architecture to extend to future and/or unknown formats.

In an embodiment, the user can also specify a post-indexing filter on the raw data as well as multiple input/output transformations. For example, there are certain tokens (encoded ASCII string md5/32 bytes long) that are better tokenized as a raw byte vectors (16 bytes long), which may require the system to accept the ASCII (to facilitate copy/paste, for example) but allow the user to specify that it must be decoded from ASCII to raw byte vector prior to issuing the hash/B-tree search.

Unlike conventional database storage systems, the underlying source media in the current system does not necessarily need write access. The system may be designed to handle any write-once-read-many media. The underlying source media may be, for example, optical storage or write blocked disk drive. In addition the underlying source data may be stored externally on tape drives and/or a combination of media unavailable at query time, though manually recoverable.

To provide additional context for various aspects of the present disclosure, such as the multi-level hash table index and/or the search engine module, the following discussion is intended to provide a brief, general description of a suitable computing environment in which the various aspects of the disclosure may be implemented. Those skilled in the art will recognize that embodiments of the disclosure also may be implemented in combination with various computer program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, networked or cloud-based computers or servers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present disclosure, it is to be understood that the embodiments contained herein are not intended to be limiting and that changes may be made without departing from the scope of the inventions as claimed. Likewise, it is to be understood that it is not necessary to meet any or all of the identified advantages or objects of the disclosure disclosed herein in order to fall within the scope of the claims, since inherent and/or unforeseen advantages of the present disclosure may exist even though they may not have been explicitly discussed herein.

TABLE 1

```
+_author_ 'dan'
+
+import idzip #need the writer class from idzip main
+import idzip.decompressor #thin wrapper as file reader
+import discodb #indexing heavy lifting
+import bson #user passes in dict
+import bsonstream
+import bsonsearch
+import re
+import sys
+
+
+ '''
+<path>[/subfolder]/<filename>.dz
+    compressed, custom gzip (idzip) file with streaming bson data.
+    Takes a python <dict> like object and converts it to bson
+    compresses the file using idzip and writes output to a binary file.
+
+
+<path>[/subfolder]/<filename>.<type>.ix :
+    discodb index file
+    key/value pairs
+    key: a token for search
+    value: uncompressed file offset for the position of the entry
           containing that field.
+
+
+<path>[/subfolder]/.<type>.ix.rix :
+    root discodb index file containing merged key/values
+    there should only be one rix file per index_name per folder
+    key: a token for search
+    value:
+ '''
+INDEX_SUFFIX = "ix"
+BINARY_SUFFIX = "dz"
+INTERMEDIATE_INDEX_SUFFIX = "int"
+ROOT_INDEX_SUFFIX = "rix"
```

TABLE 2

```
+class Writer(idzip.Writer):
+    index_suffix = INDEX_SUFFIX
+    binary_suffix = BINARY_SUFFIX
+    def _init_(self, path, subfolders, filename, sync_size=1024*1024):
+        self.path = path
+        self.subfolders = subfolders
+        self.filename = filename
+        self.full_file_name = "%s%s%s.%s" %(self.path, self.subfolders, self.filename, self.binary_suffix)
+        self.indexes = { } #{<index_name>:<IndexWriter>}
+        make_sure_path_exists("%s%s" %(self.path, self.subfolders))
+        super(Writer, self)._init_(self.full_file_name, sync_size)
+
+    def write(self, str_buffer, tokens):
+        '''
+
+        :param str_buffer:
+        :param tokens: <dict> : {<index_name>:[basestring]}
+        :return:
+        '''
+        if isinstance(str_buffer, dict):
+            str_buffer = bson.BSON.encode(str_buffer)
+        pos, buffer_len = super(Writer, self).write(str_buffer)
+        for index_name, token_list in tokens.items( ):
+            if index_name not in self.indexes:
+                self.indexes[index_name] = IndexWriter( )
+            for token in token_list:
+                #print index_name, token, hex(pos)
+                try:
+                    self.indexes[index_name].add(token, hex(pos))
+                except (UnicodeDecodeError, UnicodeError):
+                    pass #TODO:encode to ascii safe
+
+    def close(self, generate_intermediate_index=True, generate_root_index=False):
+        super(Writer, self).close( )
+        for index_name, index_writer in self.indexes.items( ):
+            index_filename = "%s.%s.%s" %(self.full_file_name,
+                    index_name,
```

TABLE 2-continued

```
+                     self.index_suffix)
+              finalized_index = index_writer.finalize_and_write(index_filename,
+                           generate_intermediate_index=generate_intermediate_index,
+                           generate_root_index=generate_root_index,
+                           index_name=index_name)
+
+
+
+
+
+
+class IndexWriter(discodb.DiscoDBConstructor):
+    def finalize_and_write(self, filename, generate_intermediate_index=False, generate_root_index=False, index_name=""):
+        finalized = self.finalize(unique_items=True)
+        with open(filename, 'wb') as f:
+            finalized.dump(f)
+        if generate_intermediate_index:
+            int_filename = self.generate_intermediate_index(finalized, filename)
+            if generate_root_index and index_name:
+                self.generate_root_index(int_filename, index_name)
+
+
+    def generate_intermediate_index(self, finalized_index, filename):
```

TABLE 3

```
+         intermediate_index = indexwriter( )
+         intermediate_index_filename = "%s.%s" %(filename, INTERMEDIATE_INDEX_SUFFIX)
+         for key in finalized_index.keysO:
+             intermediate_index.add(key, filename)
+         intermediate_index.finalize_and_write(intermediate_index_filename)
+         return intermediate_index_filename
+
+    def generate_root_index(self, path, index_name):
+        output_folder, ix_filename = os.path.split(path)
+        output_filename = "%s/%s.%s" %(output_folder, index_name, ROOT_INDEX_SUFFIX)
+        input_filenames = find_int_files_in_folder(output_folder, index_name)
+        root_index = IndexWriter( )
+        for input_filename in input_filenames:
+            with open(input_filename, 'rb') as f:
+                single_index = discodb.DiscoDB.load(f)
+                root_index. merge(single_index, False)
+        root_index.finalize_and_write(output_filename)
+        return
+
+    def generate_recursive_root_index(self, path, index_name):
+        rix_filename = "%s.%s" %(index_name, ROOT_INDEX_SUFFIX)
+        output_filename = "%s%s" %(path, rix_filename)
+        root_index = IndexWriter( )
+        found_rix_children = False
+        for folder in os.listdir(path):
+            if os.path.isdir("%s%s"%(path, folder)):
+                input_filename = "%s%s/%s" %(path, folder, rix_filename)
+                single_index = None
+                try:
+                    with open(input_filename, 'rb') as f:
+                        single_index = discodb.DiscoDB.load(f)
+                        found_rix_children = True
+                except IOError:
+                    sys.stderr.write("cant open %s: ignoring\n" %(input_filename))
+                if single_index:
+                    root_index. merge(single_index, False)
+        if found_rix_children:
+            root_index.finalize_and_write(output_filename)
+        else:
+            sys.stderr.writerfound no rix children')
+
+
+class Search(object):
+    def load(self, filename):
+       with open(filename, "rb") as f:
+           return discodb.DiscoDB.load(f)
+       return
+    def get_dz_file_from_ix_file(self, index_name, filename):
+       return filename.rstrip("%s.%s" %(index_name, INDEX_SUFFIX))
+
+    def iter_search_from_ix_file(self, filename, index_name, key):
```

TABLE 3-continued

```
+        db = self.load(filename)
+        values = db.get(key)
+        if values:
+            dzfn = self.get_dz_file_from_ix_file(index_name, filename)
+            iz = Reader(dzfn)
+            bs = bsonstream.KeyValueBSONInput(fh=iz)
+            for value in values:
+                iz.seek(int(value, 16))
```

TABLE 4

```
+                yield bs.read( )
+            iz.close( ) MTODO: Figure out how to close the cursor if not exhausted
+
+    def iter_search_from_rix_file(self, search_path, filename, index_name, key):
+        ...
+        rix file may yield another .rix file or an .ix file
+                will NOT yield a .ix.int file
+                will NOT yield a .dz file
+                (should handle all those cases without fail though)
+
+        this fnction will either recursively call itself if it contains a .rix file
+                or call iter_search_from_ix_file
+
+        this fnction is responsible to ensure the path doesnt loop back on itself.
+
+        :param search_path: <set> includes all rix/ix files in the search path
+        :param filename: <basestring> full path to an existing filethat is a rix file
+        :param index_name: <basestring> type of index (get_dz_file_from_ix_file)gtodo: find a better way to extract dz
+        :param key: <basestring> search criteria
+        :return: generator object that yields key hits
+        ...
+        if filename.endswith(ROOT_INDEX_SUFFIX):
+            rix_db = self.load(filename)
+        value_filenames_cursor = rix_db.get(key)
+        if value_filenamescursor:
+            search_files = fx for x in sorted(value_filenames_cursor, reverse=True)j
+            for search_filename in search_files:
+                if search_filename not in search_path:
+                    search_path.add(search_filename)
+                    gen = None
+                    if search_filename. endswith(INDEX_SUFFIX):
+                        gen = self.iter_search_from_ix_file(search_filename, index_name, key)
+                    elif search_filename.endswith(ROOT_INDEX_SUFFIX):
+                        gen = self.iter_search_from_rix_file(search_path, search_filename,
+                            index_name, key)
+                    if gen:
+                        for obj in gen:
+                            yield obj
+        return
+
+    def iter find_keys_with_rgx(self, rgx, filename):
+        db = self.load(filename)
+        for key in db.keys( ):
+            if re.match(rgx, key):
+                yield key
+
+
+class IndexReader(Search):
+    READ ONLY=True
+
+class Reader(idzip.decompressor.idzipFile):
+    def iama(self):
+        print "hi"
+
+
+import os
+import errno
```

TABLE 5

```
+def make_sure_path_exsists(path):
+    try:
+        os.makedirs(path)
+    except OSError as exception:
```

TABLE 5-continued

```
+         if exception.errno != errno.EEXIST:
+             raise
+
+
+def find_int_files_in_folder(path, index_name):
+     ext = "%s.%s.%s" %(2ndex_name, INDEX_SUFFIX, INTERMEDIATE_INDEX_SUFFIX)
+     file_names = ["%s/%s"%(path, fn) for fn in os.listdirr(path) if fn.endswith(ext)]
+     return file_names
setup.py
+
+_author_ = 'dan'
+
+
+
tests.py
+
+_author_= 'dan'
+Import bsonstore
+w = bsonstore.Writer("/mnt/twitter/s, "test/", "dumpdata')
+
+test_data1 = {"a":[1,2,3,4], "_id":"1234", "data":1"abc","def"]}
+test_data2 = {"a":[3,4,5,6], "_id":"3456", "data":["xyz","def-]}
+
+
+import bson
+write_test_data1 = bson.B5011.encode(test_data1)
+write_test_data2 = bson.B5011.encode(test_data2)
+
+
+tokens_1 = {"_id":[test_data1{'+_id'}],
+           "data":test_datal['data']}
+
+
+tokens_2 = {"_id":[test_data2['_id'l]],
+           "data":test_data2['data']}
+
+w.write(str(write_test_data1), tokens_1)
+w.write(str(write_test_data2), tokens_2)
+
+w.close( )
```

TABLE 6

```
@@   -215,22 +215,26 @@ def get_dz_file_from_ix_file(self, index_name, filename):
       dz_filename = removed_suffix.replace(INDEX_PARTITION( ), DATA_PARTITION( ), 1)
       return dz_filename
-    def iter_search_from_file(self, search_path, filename, index_name, key, decode=False,
      Reader_Class=None,
      parse=False):
-      if filename.endswith(ROOT_INDEX_SUFFIX( )):
-        for result in self.tier_search_from_rix_file(search_path, filename, index_name, key,
          decode=decode, Reader_Class-Reader
-          yield result
-      elif filename.endswith(INDEX_SUFFIX( )):
-        for result in self. iter_search_from_ix_file(filename, index_name, key, decode=decode,
          Reader_Class=Reader Class, parse=
-          yield result
+    def iter_search_from_file(self, search_path, filename, index_name, key, decode=False,
      Reader_Class=None,
      parse=False, max_depth
+      max_depth -= 1
+      if max_depth !=0: #so setting 0 goes until underflow and around to 0 (max recursion depth)
+        if filename.endswith(ROOT_INDEX_SUFFIX( )):
+          for result in self.iter_search_from_rix_file(search_path, filename, index_name, key,
            decode=decode, Reader_Class=
+            yield result
+        elif filename.endswith(INDEX_SUFFIC( )):
+          for result in self.iter_search_from_rix_file(search_path, file_name, index_name, key,
            decode=decode, Reader Class=Reader_Class,
            yield result
+      else:
+        yield filename
-    def iter_search_from_ix_file(self, filename, index_name, key, decode=False, Reader_Class=None,
      parse=False):
+    def iter_search_from_is_file(self, filename, index_name, key, decode=False, Reader_Class=None,
      parse=False, max_depth=No):
       try:
         db = self load(filename)
```

TABLE 6-continued

```
            if not db:
                raise IOError
        except IOError:
            if VERBOSE( ): sys.stderr.write("ix filename error %s/n" %filename)
-           if decode is not True and decode is not False:
+           if decode in (True, False, None):
                yield filename
            else:
                yield decode
@@  -260,7 +264,7 @@ def iter_search_from_ix_file(self, filename, index_name, key, decode=False, Read
            if iz is not None:
                iz.close( ) #TODO: Figure out how to close the cursor if not exhausted
-       def iter_search_from_rix_file(self, search_path, filename, index_name, key, decode=False,
        Reader_Class=None, parse=False):
```

What is claimed:

1. A variable cardinality indexing and retrieval system comprising:
a computing device comprising a processor and at least one memory in communication with the processor, the at least one memory comprising instructions executable by the processor to:
execute a multi-level hash table index comprising multiple levels of hash tables respectively pointing to at least one other level of hash tables, wherein the multi-level hash table index increases cardinality from a top index, at least one portion of the hash tables in the multi-level hash table index points to a subset comprising a multitude of records, and each hash table includes at least one unique file identification for a record in the multitude of records; and
execute a search engine receiving a token and a cardinality limit, and performing a search through the multi-level hash table index for one or more records associated with the token, wherein the search comprises a hash table lookup and a B-Tree progression, the search engine performs a token search on each hash table through the B-tree progression, and the search is limited according to the cardinality limit.

2. The system of claim 1, wherein, in response to a hit in the token search, the search engine performs a subsequent B-Tree progression from the hash table in which the hit occurred, wherein the subsequent B-Tree progression searches for a record associated with the hit, and the subsequent B-Tree progression remains limited according to the cardinality limit.

3. The system of claim 2, wherein, in response to the search engine encountering the record in the subsequent B-Tree progression, the search engine returns the respective record.

4. The system of claim 2, wherein, in response to the search engine encountering missing data in place of the record, the search engine returns the unique file identification for the record.

5. The system of claim 2, wherein, in response to the search engine reaching the cardinality limit before encountering the record, the search engine returns the unique file identification for the record.

6. The system of claim 1, wherein the token is one or more of: an IP address, an email address, a domain identifier, a character string, and an index file identifier.

7. A computer-implemented method, comprising: receiving, at a search engine, a token and a cardinality limit; and performing a search through a multi-level hash table index for one or more records associated with the token, wherein the search comprises a hash table lookup and a B-Tree progression, and the search is limited according to the cardinality limit, wherein the multi-level hash table index increases cardinality from a top index and comprises multiple levels of hash tables respectively pointing to at least one other level of hash tables, wherein at least one portion of the hash tables in the multi-level hash table index points to a subset comprising a multitude of records, the search engine performs a token search on each hash table through the B-tree progression and each hash table includes at least one unique file identification for a record in the multitude of records.

8. The method of claim 7, wherein, in response to a hit in the token search, the search engine performs a subsequent B-Tree progression from the hash table in which the hit occurred, wherein the subsequent B-Tree progression searches for a record associated with the hit, and the subsequent B-Tree progression remains limited according to the cardinality limit.

9. The method of claim 8, wherein, in response to the search engine encountering the record in the subsequent B-Tree progression, the search engine returns the respective record.

10. The method of claim 8, wherein, in response to the search engine encountering missing data in place of the record, the search engine returns the unique file identification for the record.

11. The method of claim 8, wherein, in response to the search engine reaching the cardinality limit before encountering the record, the search engine returns the unique file identification for the record.

12. The method of claim 7, wherein the token is one or more of: an IP address, an email address, a domain identifier, a character string, and an index file identifier.

13. A non-transitory computer readable storage medium comprising instructions that, when executed on a computing system, cause the computing system to at least: receive, at a search engine, a token and a cardinality limit; and perform a search through a multi-level hash table index for one or more records associated with the token, wherein the search comprises a hash table lookup and a B-Tree progression, and the search is limited according to the cardinality limit, wherein the multi-level hash table index increases cardinality from a top index and comprises multiple levels of hash tables respectively pointing to at least one other level of hash tables, wherein at least one portion of the hash tables in the multi-level hash table index points to a subset comprising a multitude of records, the search engine performs a token search on each hash table through the B-tree progression, and each hash table includes at least one unique file identification for a record in the multitude of records.

14. The non-transitory computer readable storage medium of claim 13, wherein, in response to a hit in the token search, the search engine performs a subsequent B-Tree progression from the hash table in which the hit occurred, wherein the subsequent B-Tree progression searches for a record associated with the hit, and the subsequent B-Tree progression remains limited according to the cardinality limit.

15. The non-transitory computer readable storage medium of claim 14, wherein, in response to the search engine encountering the record in the subsequent B-Tree progression, the search engine returns the respective record.

16. The non-transitory computer readable storage medium of claim 14, wherein, in response to the search engine encountering missing data in place of the record, the search engine returns the unique file identification for the record.

17. The non-transitory computer readable storage medium of claim 14, wherein, in response to the search engine reaching the cardinality limit before encountering the record, the search engine returns the unique file identification for the record.

* * * * *